United States Patent
Dauber et al.

(10) Patent No.: US 12,555,129 B2
(45) Date of Patent: Feb. 17, 2026

(54) SOFTWARE PRODUCT OPTIMIZATION IDENTIFICATION THROUGH NATURAL LANGUAGE PROCESSING

(71) Applicant: International Business Machines Corporation, Armonk, NY (US)

(72) Inventors: Melanie Dauber, Oceanside, NY (US); Zachary A. Silverstein, Georgetown, TX (US); Jeremy R. Fox, Georgetown, TX (US); Jacob Ryan Jepperson, St. Paul, MN (US); Logan Bailey, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 139 days.

(21) Appl. No.: 18/439,185

(22) Filed: Feb. 12, 2024

(65) Prior Publication Data

US 2025/0259188 A1    Aug. 14, 2025

(51) Int. Cl.
*G06Q 30/0201* (2023.01)
*G06Q 10/087* (2023.01)

(52) U.S. Cl.
CPC ....... *G06Q 30/0201* (2013.01); *G06Q 10/087* (2013.01)

(58) Field of Classification Search
CPC ........... G06Q 30/0631; G06Q 30/0627; G06Q 30/0201; G06Q 30/0282; G06Q 30/0203
See application file for complete search history.

(56) References Cited

U.S. PATENT DOCUMENTS

| | | | |
|---|---|---|---|
| 6,665,867 B1 * | 12/2003 | Ims .................. | H04L 67/34 |
| | | | 717/173 |
| 7,269,824 B2 * | 9/2007 | Noy ................... | G06F 11/3495 |
| | | | 717/130 |
| 7,792,841 B2 * | 9/2010 | McAllister ......... | G06Q 30/02 |
| | | | 707/755 |

(Continued)

OTHER PUBLICATIONS

Apptrace takes the pain out of app review insight with sentiment analysis Tech Forge, Dec. 6, 2012 (Year: 2012).*

(Continued)

*Primary Examiner* — Scott L Jarrett
(74) *Attorney, Agent, or Firm* — Yee & Associates, P.C.

(57) ABSTRACT

Software product optimization is provided. Expressed sentiment in a set of opted in user-to-user business-related conversations among a group of users corresponding to an entity is associated with a software product in response to determining that the software product is identified by mentioned keywords in the set of opted in user-to-user business-related conversations based on a keyword corpus. It is determined whether the expressed sentiment associated with the software product is negative sentiment. A related software product listed in a software product catalog of the entity is identified as an optimization to the software product in response to determining that the expressed sentiment associated with the software product is negative sentiment. A recommendation to implement the related software product as the optimization to the software product is generated. The recommendation to implement the related software product as the optimization to the software product is sent to the group of users.

20 Claims, 5 Drawing Sheets

(56) References Cited

U.S. PATENT DOCUMENTS

| | | | | |
|---|---|---|---|---|
| 7,954,090 | B1* | 5/2011 | Qureshi | G06N 5/048 |
| | | | | 714/48 |
| 8,291,490 | B1* | 10/2012 | Ahmed | G06F 21/604 |
| | | | | 726/20 |
| 8,296,168 | B2* | 10/2012 | Subrahmanian | G06F 16/345 |
| | | | | 705/7.11 |
| 8,635,590 | B1* | 1/2014 | Ogilvie | G06F 8/33 |
| | | | | 717/110 |
| 8,738,363 | B2* | 5/2014 | Brun | G06F 40/247 |
| | | | | 704/4 |
| 8,799,773 | B2* | 8/2014 | Reis | G06F 16/345 |
| | | | | 707/750 |
| 8,909,771 | B2 | 12/2014 | Heath | |
| 9,038,054 | B1* | 5/2015 | Kozak | G06Q 30/02 |
| | | | | 717/173 |
| 9,588,760 | B1* | 3/2017 | Bostick | G06F 8/71 |
| 9,619,828 | B2* | 4/2017 | Nikolic | G06Q 30/0282 |
| 9,823,919 | B2* | 11/2017 | Choudhari | G06F 9/44505 |
| 9,880,712 | B2* | 1/2018 | Slawson | G06F 8/65 |
| 10,380,505 | B2 | 8/2019 | Gaon et al. | |
| 10,475,072 | B2 | 11/2019 | Lampert et al. | |
| 10,489,510 | B2* | 11/2019 | Jiang | G06F 40/242 |
| 11,074,636 | B1* | 7/2021 | Vora | G06F 16/9535 |
| 11,093,487 | B2 | 8/2021 | Erpenbach et al. | |
| 11,249,743 | B2* | 2/2022 | Cannon | G06F 8/65 |
| 11,532,022 | B2* | 12/2022 | Aswani | G06Q 30/0282 |
| 11,816,573 | B1* | 11/2023 | Garvey | G06F 16/345 |
| 2008/0249764 | A1* | 10/2008 | Huang | G06F 40/30 |
| | | | | 704/9 |
| 2013/0096909 | A1* | 4/2013 | Brun | G06F 40/295 |
| | | | | 704/9 |
| 2013/0254121 | A1* | 9/2013 | Hockings | G06F 8/70 |
| | | | | 709/224 |
| 2014/0365207 | A1* | 12/2014 | Convertino | G06F 40/279 |
| | | | | 704/9 |
| 2017/0200207 | A1* | 7/2017 | Aswani | G06Q 30/0282 |
| 2017/0236131 | A1* | 8/2017 | Nathenson | G06Q 30/0201 |
| | | | | 705/26.7 |
| 2018/0307677 | A1* | 10/2018 | Jiang | G06F 40/30 |
| 2019/0164095 | A1* | 5/2019 | Argyros | G06Q 10/0633 |
| 2019/0164208 | A1 | 5/2019 | Dhoolia et al. | |
| 2019/0325498 | A1 | 10/2019 | Clark | |
| 2021/0149658 | A1* | 5/2021 | Cannon | G06N 3/04 |
| 2021/0374033 | A1* | 12/2021 | Yang | G06F 11/3452 |
| 2023/0071799 | A1* | 3/2023 | Ramnani | G06N 20/00 |
| 2023/0214888 | A1* | 7/2023 | Renard | G06Q 30/016 |
| | | | | 705/7.29 |
| 2024/0354789 | A1* | 10/2024 | Garvey | G06N 20/00 |
| 2024/0378654 | A1* | 11/2024 | Olivier | G06Q 30/0631 |

OTHER PUBLICATIONS

Dabrowski, Jacek et al., Analysing app reviews for software engineering: a systematic literature review Empirical Software Engineering, vol. 27, No. 43, 2022 (Year: 2022).*

Dabrowski, Jacek et al., Mining User Opinions To Support Requirement Engineering: An Empirical Study. In International Conference on Advanced Information Systems Engineering CAISE, 2020 (Year: 2020).*

Guzman, Emitza et al., How Do Users Like This Feature? A Fine Grained Sentiment Analysis of App Reviews IEEE, 2014 (Year: 2014).*

Johann, Timo et al., Safe: A Simple Approach for Feature Extraction from App Descriptions and App Reviews 2017 IEEE 25th International Requirements Engineering Conference, 2017 (Year: 2017).*

Licorish, Sherlock A et al., Attributes that Predict which Features to Fix: Lessons for App Store Mining ACM, EASE'17, Jun. 2017 (Year: 2017).*

Amazon, "Cloud Computing Services—Amazon Web Services (AWS)," aws.amazon.com, 13 pages, accessed Feb. 5, 2024, https://aws.amazon.com/.

Google, "Cloud Computing Services | Google Cloud," cloud.google.com, 12 pages, accessed Feb. 5, 2024, https://cloud.google.com/.

IBM, "IBM watsonx—An AI and data platform built for business," ibm.com/watsonx, 17 pages, accessed Feb. 5, 2024, https://www.ibm.com/watsonx.

Microsoft, "Cloud Computing Services | Microsoft Azure," azure.microsoft.com, 9 pages, accessed Feb. 5, 2024, https://azure.microsoft.com/en-us.

* cited by examiner

SOFTWARE PRODUCT OPTIMIZATION IDENTIFICATION THROUGH NATURAL LANGUAGE PROCESSING

BACKGROUND

The disclosure relates generally to software and more specifically to software product optimization.

Software is a set of instructions or commands that tell a computer or other type of data processing device or system what to do. A software product is a software program or application that has been developed for the benefit of users to satisfy a user or entity need. This includes, for example, software products sold as a download, such as a mobile application, software products sold as a service, such as, for example, a news feed, and software products sold in physical form, such as compact disc. There are two main types of software products, generic software products and customized software products. A generic software product is developed with a broad user base in mind and includes "off the shelf" software products that have more general features and functionalities, such as, for example, word processing software products, spreadsheet software products, and the like. A customized software product is developed for a specific entity or user base and has more specific features and functionalities, such as, for example, an airline reservation software product, a software product developed for an internal team of a particular entity, and the like.

SUMMARY

According to one illustrative embodiment, a computer-implemented method for software product optimization is provided. A computer associates expressed sentiment in a set of opted in user-to-user business-related conversations among a group of users corresponding to an entity with a software product in response to the computer, using a natural language processing and understanding model, determining that the software product is identified by mentioned keywords in the set of opted in user-to-user business-related conversations among the group of users corresponding to the entity based on a keyword corpus. The computer, using the natural language processing and understanding model, determines whether the expressed sentiment associated with the software product is negative sentiment. The computer identifies a related software product listed in a software product catalog of the entity as an optimization to the software product in response to the computer, using the natural language processing and understanding model, determining that the expressed sentiment associated with the software product is negative sentiment. The computer generates a recommendation to implement the related software product as the optimization to the software product. The computer sends the recommendation to implement the related software product as the optimization to the software product to the group of users corresponding to the entity using an optimal notification application. According to other illustrative embodiments, a computer system and computer program product for software product optimization are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
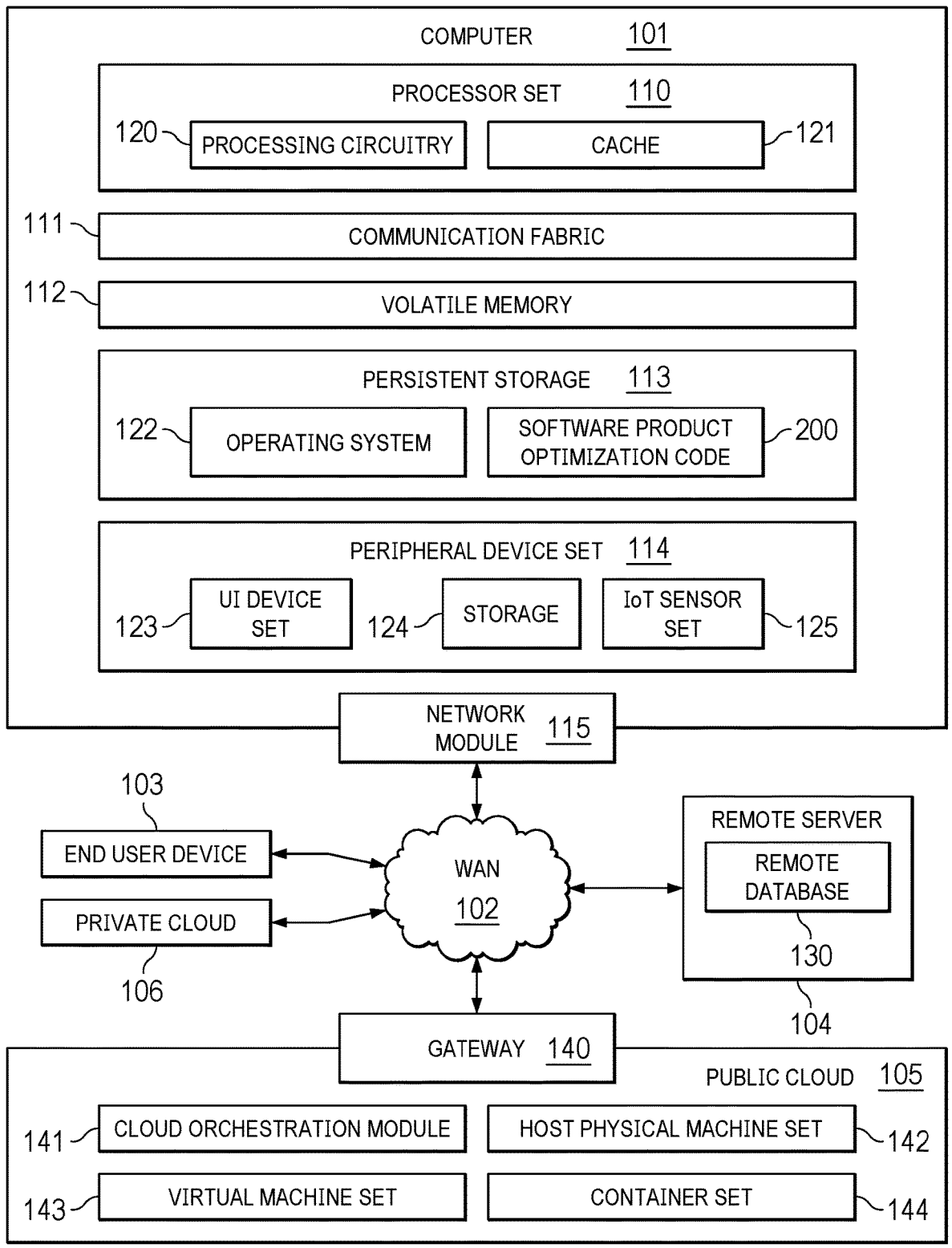
FIG. 1 is a pictorial representation of a computing environment in which illustrative embodiments may be implemented.

With reference now to the figures, and in particular, with reference to FIG. 1, a diagram of data processing environments is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as software product optimization code 200. For example, software product optimization code 200 monitors and processes natural language conversations between users within user-to-user communications, such as, for example, web conferences, teleconferences, instant messages, text messages, emails, and the like, corresponding to an entity (e.g., enterprise, business, company, organization, institution, agency, or the like). Software product optimization code 200 also connects to and accesses a software product catalog, which includes a software-as-a-service (SaaS) catalog, corresponding to the entity. Software product optimization code 200 performs keyword and sentiment analysis using a natural language processing and understanding model or algorithm to identify software product optimizations or customizations corresponding to software products in the software product catalog that were discussed within the user-to-user communications to expand at least one of usage, performance, functionality, capability, and the like of currently utilized software products of the entity.

As a result, by connecting with the entity-specific software product catalog, software product optimization code 200 can identify software product optimization or customization opportunities for one or more software products currently utilized by the entity through the analysis of the user-to-user communications and sentiment expressed in the user-to-user communications regarding the one or more software products using a set of related software products listed in the entity-specific software product catalog as the optimization or customization. Thus, software product optimization code 200 has an internal entity-oriented focus to optimize or customize software products of the entity rather than the consumer-oriented focus of current solutions.

For example, software product optimization code 200 seamlessly integrates with the entity-specific software product catalog, which includes a SaaS catalog, along with application or license management tools to process the software product data in a secure and compliant manner. Software product optimization code 200 utilizes the natural language processing and understanding model to accurately process and understand the context and terminology specific to internal communications between users corresponding to the entity. This includes software product optimization code 200 utilizing a knowledge corpus that includes industry-specific keywords and terminology used in the user-to-user business-related conversations corresponding to the entity.

Software product optimization code 200 utilizes the sentiment analysis to discern the tone and intent in these user-to-user business-related conversations. This sentiment analysis of software product optimization code 200 includes an ability to detect nuances, such as, for example, hesitation, urgency, satisfaction, or the like, in these user-to-user business-related conversations that may not be evident in general conversations.

Software product optimization code 200 processes these user-to-user business-related conversations in real time or near real time and immediately generates contextually relevant recommendations regarding the software product optimizations or customizations for the one or more software products currently utilized by the entity with speed and accuracy. For example, software product optimization code 200 identifies relevant keywords regarding the one or more software products currently utilized by the entity within these user-to-user business-related conversations based on the context of these user-to-user business-related conversations. Furthermore, software product optimization code 200 only processes opted in conversations between users of the entity who previously consented to software product optimization code 200 processing their business-related conversations.

Moreover, software product optimization code 200 links the software product optimizations or customizations to current real time software product inventory of the entity, which includes both digital and physical software product inventory, to ensure that the recommended related software product for the optimization or customization of the currently used software product by the entity is currently available. For example, during a business-related conversation among a group of users of the entity, software product optimization code 200, using the natural language processing and understanding model, determines that one or more of the group of users are expressing concern that a current software product utilized by the entity lacks a needed level of data security. In response to detecting the concern regarding the lack of data security in that software product, software product optimization code 200 identifies and recommends, for example, a data security software product, which is related to the software product of concern, from the software product catalog to optimize or customize that software product for increased data security. This involves software product optimization code 200 connecting to and accessing the inventory management system of the entity.

In addition, software product optimization code 200 utilizes a feedback loop to continuously improve the accuracy of the software product optimization or customization recommendations based on user interactions and feedback that indicate the effectiveness of previously recommended software product optimizations or customizations. Software product optimization code 200 utilizes the user interactions and feedback to further train the natural language processing and understanding model.

In addition to software product optimization code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and software product optimization code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in software product optimization code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user corresponding to an entity that utilizes the software product optimization services provided by computer 101), and may take any of the forms discussed above in connection with computer 101. It should be noted that EUD 103 can represent a plurality of end user devices operated by a plurality of different users. EUD 103 typically receives helpful and useful data from the operations of computer 101. For example, in a hypothetical case where computer 101 is designed to provide a software product optimization or customization recommendation to the end user, this recommendation would typically be communicated from network module 115 of computer 101 through WAN 102 to EUD 103. In this way, EUD 103 can display, or otherwise present, the software product optimization or customization recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a software product optimization or customization recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For many entities, both large and small, the ability to utilize quality software products is important. However, there are times when an entity is not aware of all of the software products in a software product catalog of the entity that are available to optimize or customize other related software products currently utilized by the entity. Illustrative embodiments identify these software product optimizations or customizations for software products currently utilized by a client entity.

For example, illustrative embodiments utilize natural language processing and understanding to identify and notify client entities of available software product optimizations or customizations, which can increase at least one of usage, performance, functionality, capability, and the like of currently utilized software products of the client entities. Illustrative embodiments are capable of detecting these software product optimizations or customizations within user-to-user business-related conversations based on context of the conversations utilizing natural language processing and understanding, while providing a seamless and non-intrusive experience for the client entities.

Illustrative embodiments first receive consent or permission from each of a group of users corresponding to the entity for illustrative embodiments to monitor and process user-to-user business-related conversations regarding software products corresponding to the entity. In addition, illustrative embodiments receive consent or permission from the group of users to connect to and access a set of user-to-user communication applications utilized by the group of users to conduct these user-to-user business-related conversations. In other words, during a registration process for the software product optimization services provided by illustrative embodiments, each respective user of the group of users opts in to the monitoring and processing of the user-to-user business-related conversations by illustrative embodiments via the opted in set of user-to-user communication applications. It should be noted that the opted in user-to-user business-related conversations include both verbal and textual conversations or communications, such as, for example, web conferences, teleconferences, instant messages, text messages, emails, and the like.

Illustrative embodiments connect or integrate with a software product catalog, which includes a SaaS catalog, corresponding to the entity. In addition, illustrative embodiments connect or integrate with a software product or license management tool to determine, for example, whether a particular software product optimization or customization recommendation will work with a particular software product currently being utilized by the entity, whether that particular software product optimization or customization is allowed or not for that particular software product currently being utilized by the entity, and the like. Further, illustrative embodiments connect or integrate with a knowledge corpus or contractual processing component to determine, for example, whether that particular software product optimization or customization has already been implemented in that particular software product currently being utilized by the entity, whether that particular software product optimization or customization complies with contractual terms regarding that particular software product currently being utilized by the entity, and the like.

Furthermore, for each respective software product listed in the software product catalog of the entity, illustrative embodiments utilize a list of keywords in association with the knowledge corpus based on relevant contextual factors. The keywords may include, for example, adjacent context, specific language or terminology, and the like. Illustrative embodiments utilize the keywords in specific context of user-to-user business-related conversations for determining software product optimization or customization recommendations.

Illustrative embodiments process the opted in user-to-user business-related conversations among the group of users utilizing, for example, speech-to-text conversion of web conferences, teleconferences, and the like. Illustrative embodiments also utilize natural language processing and understanding to process the speech-to-text conversions and other textual communications, such as, for example, instant messages, text messages, emails, and the like, among the group of users. In addition, illustrative embodiments perform sentiment analysis to determine negative sentiment (e.g., hesitation, concern, worry, or the like) or positive sentiment (e.g., satisfaction, peace of mind, relief, delight, or the like) expressed by one or more of the group of users in the user-to-user business-related conversations regarding a software product currently being utilized by the entity. In other words, illustrative embodiments determine what was said regarding the software product currently being utilized by the entity and how it was said to determine a set of related software products listed in the software product catalog of the entity that illustrative embodiments can utilize to optimize or customize the software product to enhance the capabilities, functionalities, performance, usage, or the like of that particular software product to meet the current needs of the entity.

Moreover, illustrative embodiments identify the context of the user-to-user business-related conversations to determine applicable or relevant software product optimizations or customizations for the software product currently being used by the entity. For example, illustrative embodiments identify when a particular keyword or term was mentioned by a user in the user-to-user business-related conversation regarding the software product currently being used by the entity and any other keywords that were mentioned along with their corresponding context. Illustrative embodiments also identify whether the software product is mentioned while the software product is currently executing or after execution of the software product to determine context. In addition, illustrative embodiments identify how the entity is utilizing the software product to determine context.

Illustrative embodiments then generate a recommendation for a software product optimization or customization of the software product currently being utilized by the entity based on the natural language processing and understanding of the user-to-user business-related conversations identifying any user expressed sentiment and mentioned keywords with corresponding context regarding the software product. Illustrative embodiments also determine whether the optimizing or customizing software product for the currently used software product is available based on the current software product inventory of the entity. Illustrative embodiments may utilize a defined minimum inventory level for the optimizing or customizing software product. For example, if illustrative embodiments determine that the optimizing or customizing software product is currently available (i.e., the current inventory level of that optimizing or customizing software product is greater than the defined minimum inventory level for that optimizing or customizing software product), then illustrative embodiments send the software product optimization or customization recommendation to the group of users for implementation. Alternatively, in addition to sending the software product optimization or customization recommendation to the group of users, illustrative embodiments can automatically implement the optimizing or customizing software product in the currently used software product. Moreover, illustrative embodiments collect feedback from the group of user regarding the software product optimization or customization of the software product currently being used by the entity. Illustrative embodiments utilize the feedback from the group of user to increase the recommendation accuracy of future software product optimizations or customizations.

Thus, illustrative embodiments provide one or more technical solutions that overcome a technical problem with an inability of current solutions to identify software product optimization opportunities using natural language processing and understanding of user-to-user business-related conversations among a group of users corresponding to an entity. As a result, these one or more technical solutions provide a technical effect and practical application in the field of software product optimization.

Figure 2:
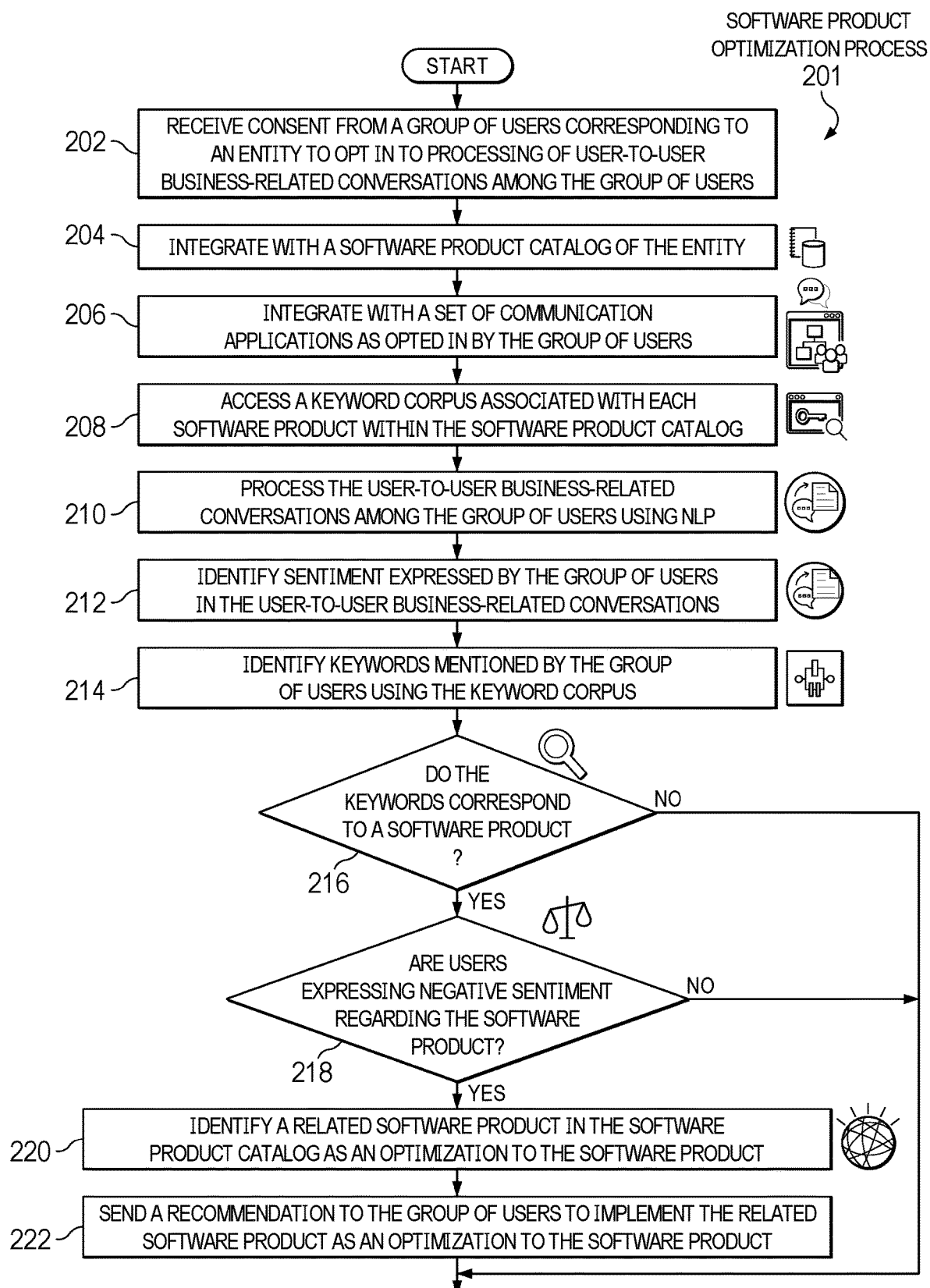
FIG. 2 is a diagram illustrating an example of a software product optimization process in accordance with an illustrative embodiment.

With reference now to FIG. 2, a diagram illustrating an example of a software product optimization process is depicted in accordance with an illustrative embodiment. Software product optimization process 201 may be implemented in a computer, such as, for example, computer 101 in FIG. 1. For example, software product optimization process 201 may be implemented by software product optimization code 200 in FIG. 1.

In this example, software product optimization process 201 starts at 202 where the computer receives consent from a group of users corresponding to entity to opt in to processing of user-to-user business-related conversations among the group of users. The computer may receive the consent from the group of users during, for example, a registration process for the software product optimization services provided by the computer.

At 204, in response to receiving the consent from the group of users corresponding to the entity, the computer integrates with a product software catalog of the entity that includes a plurality of different software products corresponding to the entity. In addition, at 206, the computer integrates with a set of communication applications as opted in by the group of users. Further, at 208, the computer accesses a keyword corpus associated with each software product within the software product catalog of the entity.

At 210, the computer processes the user-to-user business-related conversations among the group of users using natural language processing and understanding. At 212, the computer, using natural language processing and understanding, identifies sentiment expressed by one or more of the group of users in the user-to-user business-related conversations. At 214, the computer, using natural language processing and understanding, also identifies keywords mentioned in the user-to-user business-related conversations.

At 216, the computer, using natural language processing and understanding, makes a determination as to whether the keywords correspond to a software product corresponding to the entity. If the computer determines that the keywords do not correspond to a software product corresponding to the entity, then software product optimization process 201 terminates thereafter. If the computer determines that the keywords do correspond to a software product corresponding to the entity, then, at 218, the computer makes another determination as to whether one or more of the group of users are expressing negative sentiment regarding the software product.

If the computer determines that the group of users are not expressing negative sentiment regarding the software product, then software product optimization process 201 terminates thereafter. If the computer determines that one or more of the group of users are expressing negative sentiment regarding the software product, then, at 220, the computer identifies a related software product in the software production catalog of the entity as an optimization to the software product. At 222, the computer sends a recommendation to the group of users to implement the related software product as an optimization to the software product. Thereafter, software product optimization process 201 terminates.

Figure 3A:
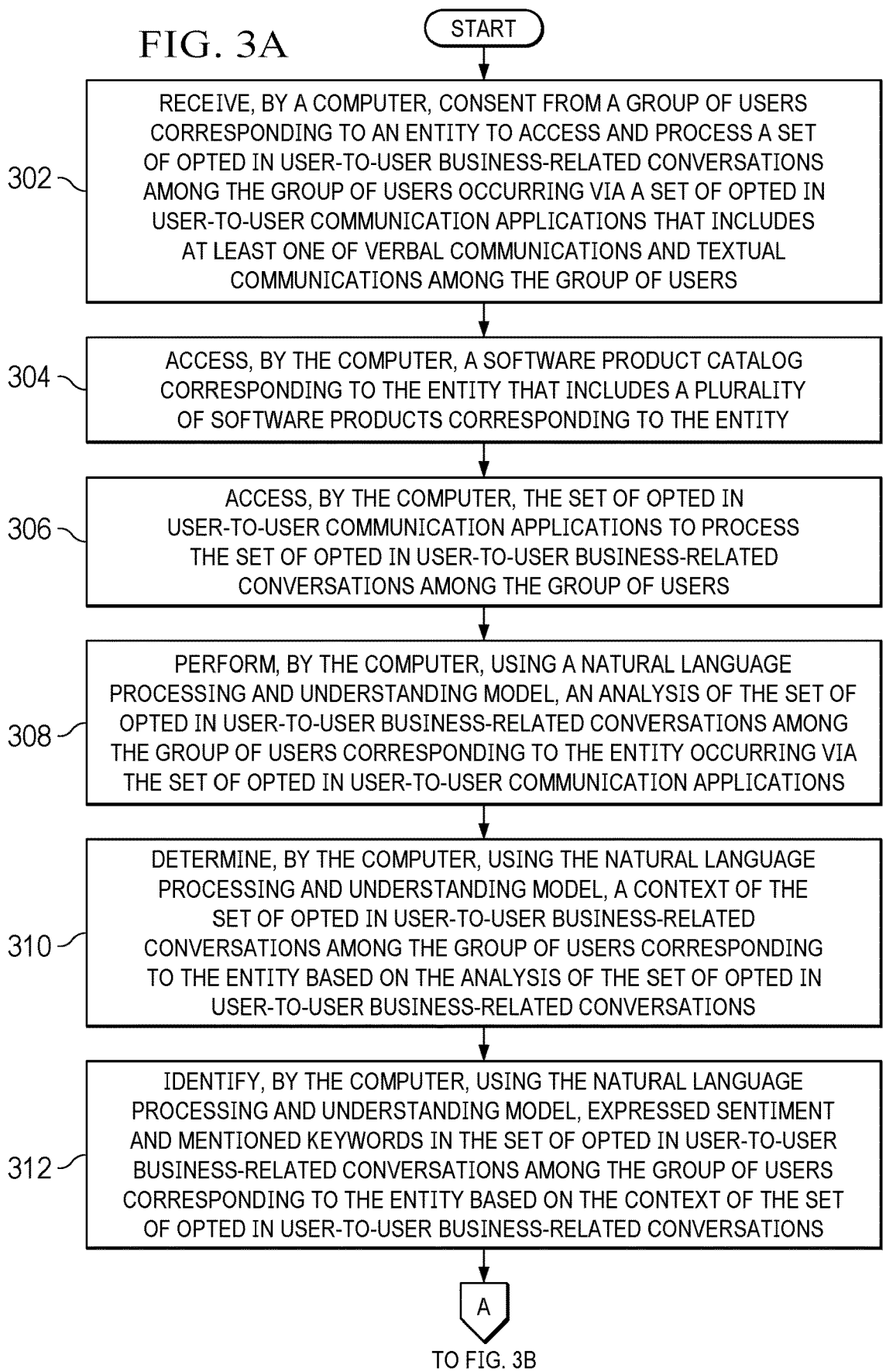
FIGS. 3A-3C are a flowchart illustrating a process for software product optimization in accordance with an illustrative embodiment.
Figure 3B:
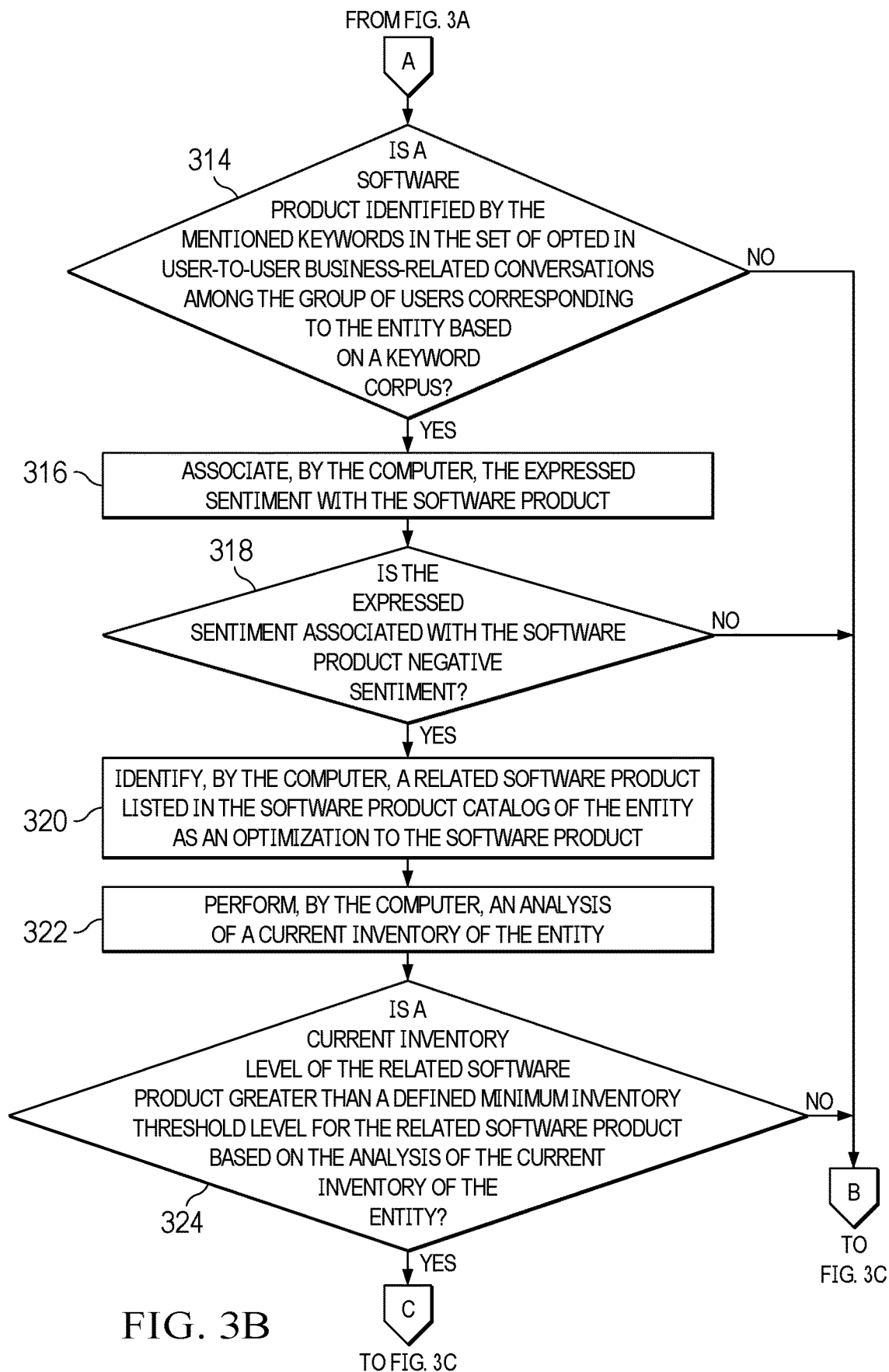
Figure 3C:
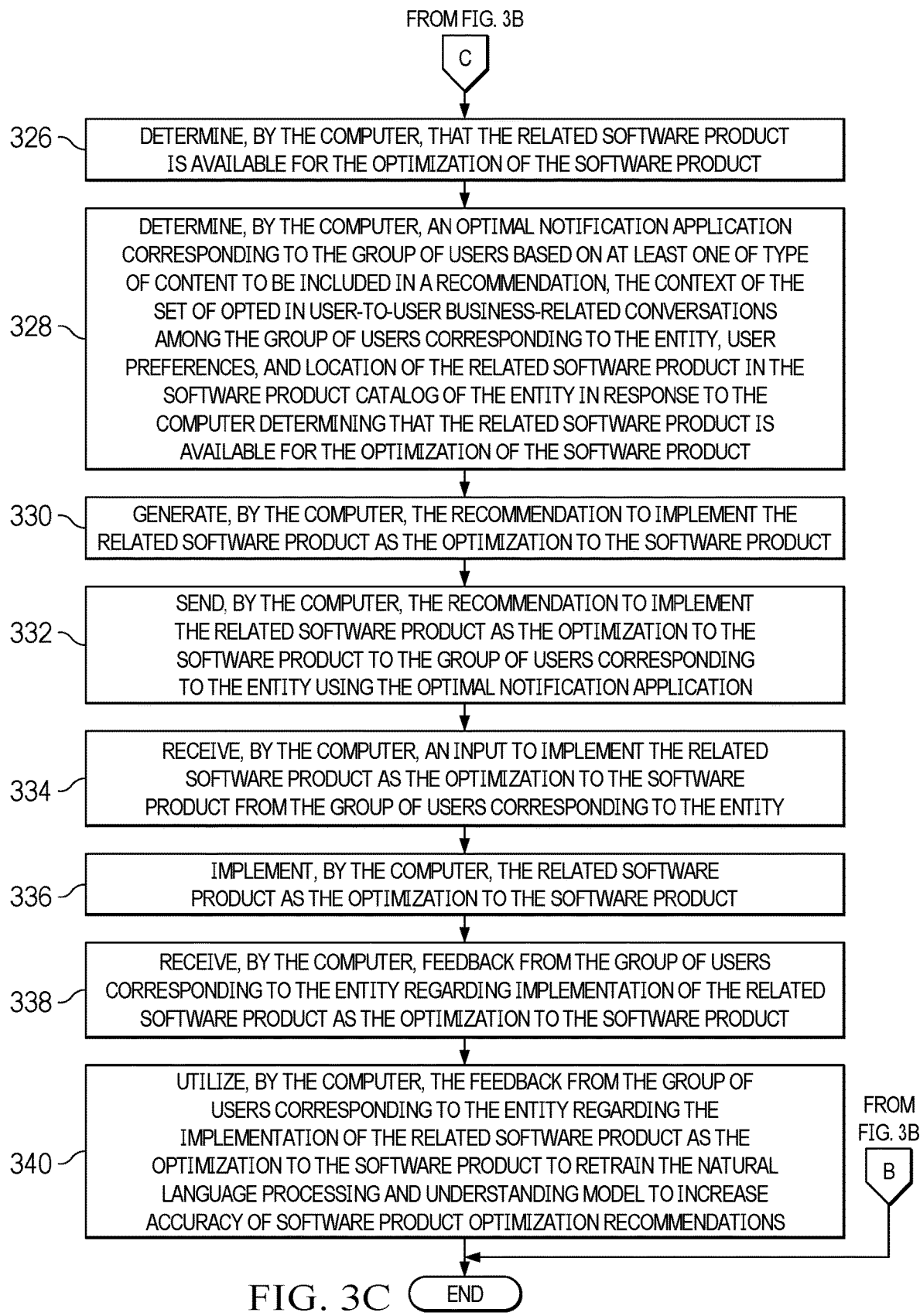

With reference now to FIGS. 3A-3C, a flowchart illustrating a process for software product optimization is shown in accordance with an illustrative embodiment. The process shown in FIGS. 3A-3C may be implemented in a computer, such as, for example, computer 101 in FIG. 1. For example, the process shown in FIGS. 3A-3C may be implemented by software product optimization code 200 in FIG. 1.

The process begins when the computer receives consent from a group of users corresponding to an entity to access and process a set of opted in user-to-user business-related conversations among the group of users occurring via a set of opted in user-to-user communication applications that includes at least one of verbal communications and textual communications among the group of users (step 302). In response to receiving the consent from the group of users, the computer accesses a software product catalog corresponding to the entity that includes a plurality of software products corresponding to the entity (step 304). In addition, the computer accesses the set of opted in user-to-user communication applications to process the set of opted in user-to-user business-related conversations among the group of users (step 306).

The computer, using a natural language processing and understanding model, performs an analysis of the set of opted in user-to-user business-related conversations among the group of users corresponding to the entity occurring via the set of opted in user-to-user communication applications (step 308). The computer, using the natural language processing and understanding model, determines a context of the set of opted in user-to-user business-related conversations among the group of users corresponding to the entity based on the analysis of the set of opted in user-to-user business-related conversations (step 310). Further, the computer, using the natural language processing and understanding model, identifies expressed sentiment and mentioned keywords in the set of opted in user-to-user business-related conversations among the group of users corresponding to the entity based on the context of the set of opted in user-to-user business-related conversations (step 312).

The computer, using the natural language processing and understanding model, determines whether a software product is identified by the mentioned keywords in the set of opted in user-to-user business-related conversations among the group of users corresponding to the entity based on a keyword corpus (step 314). If the computer, using the natural language processing and understanding model, determines that a software product is not identified by the mentioned keywords in the set of opted in user-to-user business-related conversations among the group of users corresponding to the entity based on the keyword corpus, no output of step 314, then the process terminates thereafter. If the computer, using the natural language processing and understanding model, determines that a software product is identified by the mentioned keywords in the set of opted in user-to-user business-related conversations among the group of users corresponding to the entity based on the keyword corpus, no output of step 314, then the computer associates the expressed sentiment with the software product (step 316).

Afterward, the computer, using the natural language processing and understanding model, makes a determination as to whether the expressed sentiment associated with the software product is negative sentiment (step 318). If the computer, using the natural language processing and understanding model, determines that the expressed sentiment associated with the software product is not negative sentiment, no output of step 318, then the process terminates thereafter. If the computer, using the natural language processing and understanding model, determines that the expressed sentiment associated with the software product is negative sentiment, yes output of step 318, then the computer identifies a related software product listed in the software product catalog of the entity as an optimization to the software product (step 320).

Moreover, the computer performs an analysis of a current inventory of the entity (step 322). The computer makes a determination as to whether a current inventory level of the related software product is greater than a defined minimum inventory threshold level for the related software product based on the analysis of the current inventory of the entity (step 324). If the computer determines that the current inventory level of the related software product is not greater than the defined minimum inventory threshold level for the related software product based on the analysis of the current inventory of the entity, no output of step 324, then the process terminates thereafter. If the computer determines that the current inventory level of the related software product is greater than the defined minimum inventory threshold level for the related software product based on the analysis of the current inventory of the entity, yes output of step 324, then the computer determines that the related software product is available for the optimization of the software product (step 326).

Furthermore, the computer determines an optimal notification application corresponding to the group of users based on at least one of type of content (e.g., at least one of verbal content and textual content) to be included in a recommendation, the context of the set of opted in user-to-user business-related conversations among the group of users corresponding to the entity, user preferences, and location of the related software product in the software product catalog of the entity in response to the computer determining that the related software product is available for the optimization of the software product (step 328). The computer generates the recommendation to implement the related software product as the optimization to the software product (step 330). The computer sends the recommendation to implement the related software product as the optimization to the software product to the group of users corresponding to the entity using the optimal notification application (step 332).

Subsequently, the computer receives an input to implement the related software product as the optimization to the software product from the group of users corresponding to the entity (step 334). In response to receiving the input, the computer implements the related software product as the optimization to the software product (step 336).

Afterward, the computer receives feedback from the group of users corresponding to the entity regarding implementation of the related software product as the optimization to the software product (step 338). The computer utilizes the feedback from the group of users corresponding to the entity regarding the implementation of the related software product as the optimization to the software product to retrain the natural language processing and understanding model to increase accuracy of software product optimization recommendations (step 340). Thereafter, the process terminates.

Thus, illustrative embodiments of the present disclosure provide a computer-implemented method, computer system, and computer program product for software product optimization. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for software product optimization, the computer-implemented method comprising:

associating, by a computer, expressed sentiment in a set of opted in user-to-user business-related conversations among a group of users corresponding to an entity with a software product in response to the computer, using a natural language processing and understanding model, determining that the software product is identified by mentioned keywords in the set of opted in user-to-user business-related conversations among the group of users corresponding to the entity based on a keyword corpus during execution of the software product;

determining, by the computer, using the natural language processing and understanding model, whether the expressed sentiment associated with the software product is negative sentiment;

identifying, by the computer, a related software product listed in a software product catalog of the entity as an optimization to the software product in response to the computer, using the natural language processing and understanding model, determining that the expressed sentiment associated with the software product is negative sentiment;

generating, by the computer, a recommendation to implement the related software product as the optimization to the software product;

sending, by the computer, the recommendation to implement the related software product as the optimization to the software product to the group of users corresponding to the entity using an optimal notification application;

receiving, by the computer, an input to implement the related software product as the optimization to the software product; and automatically implementing, by the computer, the related software product as the optimization to the software product in response to receiving the input to increase at least one of usage, performance, functionality, capability of the software product.

2. The computer-implemented method of claim 1, wherein the set of opted in user-to-user business-related conversations comprise both verbal and textual conversations.

3. The computer-implemented method of claim 1, further comprising:
receiving, by the computer, feedback from the group of users corresponding to the entity regarding implementation of the related software product as the optimization to the software product; and
utilizing, by the computer, the feedback from the group of users corresponding to the entity regarding the implementation of the related software product as the optimization to the software product to retrain the natural language processing and understanding model to increase accuracy of software product optimization recommendations.

4. The computer-implemented method of claim 1, further comprising:
performing, by the computer, an analysis of a current inventory of the entity;
determining, by the computer, whether a current inventory level of the related software product is greater than a defined minimum inventory threshold level for the related software product based on the analysis of the current inventory of the entity; and
determining, by the computer, that the related software product is available for the optimization of the software product in response to the computer determining that the current inventory level of the related software product is greater than the defined minimum inventory threshold level for the related software product based on the analysis of the current inventory of the entity.

5. The computer-implemented method of claim 1, further comprising:
determining, by the computer, the optimal notification application corresponding to the group of users based on at least one of type of content to be included in the recommendation, context of the set of opted in user-to-user business-related conversations among the group of users corresponding to the entity, user preferences, and location of the related software product in the software product catalog of the entity.

6. The computer-implemented method of claim 1, further comprising:
receiving, by the computer, consent from the group of users corresponding to the entity to access and process the set of opted in user-to-user business-related conversations among the group of users occurring via the set of opted in user-to-user communication applications that includes at least one of verbal communications and textual communications among the group of users;
accessing, by the computer, the software product catalog corresponding to the entity that includes a plurality of software products corresponding to the entity; and
accessing, by the computer, the set of opted in user-to-user communication applications to process the set of opted in user-to-user business-related conversations among the group of users.

7. The computer-implemented method of claim 1, further comprising:
performing, by the computer, using the natural language processing and understanding model, an analysis of the set of opted in user-to-user business-related conversations among the group of users corresponding to the entity occurring via the set of opted in user-to-user communication applications;
determining, by the computer, using the natural language processing and understanding model, a context of the set of opted in user-to-user business-related conversations among the group of users corresponding to the entity based on the analysis of the set of opted in user-to-user business-related conversations; and
identifying, by the computer, using the natural language processing and understanding model, the expressed sentiment and the mentioned keywords in the set of opted in user-to-user business-related conversations among the group of users corresponding to the entity based on the context of the set of opted in user-to-user business-related conversations.

8. The computer-implemented method of claim 1, wherein the optimization of the software product using the related software product expands at least one of usage, performance, functionality, and capability of the software product.

9. A computer system for software product optimization, the computer system comprising:
a communication fabric;
a set of computer-readable storage media connected to the communication fabric, wherein the set of computer-readable storage media collectively stores program instructions; and
a set of processors connected to the communication fabric, wherein the set of processors executes the program instructions to:
associate expressed sentiment in a set of opted in user-to-user business-related conversations among a group of users corresponding to an entity with a software product in response to determining, using a natural language processing and understanding model, that the software product is identified by mentioned keywords in the set of opted in user-to-user business-related conversations among the group of users corresponding to the entity based on a keyword corpus during execution of the software product;
determining, using the natural language processing and understanding model, whether the expressed sentiment associated with the software product is negative sentiment;
identifying a related software product listed in a software product catalog of the entity as an optimization to the software product in response to determining, using the natural language processing and understanding model, that the expressed sentiment associated with the software product is negative sentiment;
generate a recommendation to implement the related software product as the optimization to the software product;
send the recommendation to implement the related software product as the optimization to the software product to the group of users corresponding to the entity using an optimal notification application;
receiving, by the computer, an input to implement the related software product as the optimization to the software product; and
automatically implementing, by the computer, the related software product as the optimization to the software product in response to receiving the input to increase at least one of usage, performance, functionality, capability of the software product.

10. The computer system of claim 9, wherein the set of opted in user-to-user business-related conversations comprise both verbal and textual.

11. The computer system of claim 9, wherein the set of processors further executes the program instructions to:
receive feedback from the group of users corresponding to the entity regarding implementation of the related software product as the optimization to the software product; and
utilize the feedback from the group of users corresponding to the entity regarding the implementation of the related software product as the optimization to the software product to retrain the natural language processing and understanding model to increase accuracy of software product optimization recommendations.

12. The computer system of claim 9, wherein the set of processors further executes the program instructions to:
perform an analysis of a current inventory of the entity;
determine whether a current inventory level of the related software product is greater than a defined minimum inventory threshold level for the related software product based on the analysis of the current inventory of the entity; and
determine that the related software product is available for the optimization of the software product in response to determining that the current inventory level of the related software product is greater than the defined minimum inventory threshold level for the related software product based on the analysis of the current inventory of the entity.

13. The computer system of claim 9, wherein the set of processors further executes the program instructions to:
determine the optimal notification application corresponding to the group of users based on at least one of type of content to be included in the recommendation, context of the set of opted in user-to-user business-related conversations among the group of users corresponding to the entity, user preferences, and location of the related software product in the software product catalog of the entity.

14. A computer program product for software product optimization, the computer program product comprising a set of computer-readable storage media having program instructions collectively stored therein, the program instructions executable by a computer to cause the computer to:
associate expressed sentiment in a set of opted in user-to-user business-related conversations among a group of users corresponding to an entity with a software product in response to determining, using a natural language processing and understanding model, that the software product is identified by mentioned keywords in the set of opted in user-to-user business-related conversations among the group of users corresponding to the entity based on a keyword corpus during execution of the software product;
determining, using the natural language processing and understanding model, whether the expressed sentiment associated with the software product is negative sentiment;
identifying a related software product listed in a software product catalog of the entity as an optimization to the software product in response to determining, using the natural language processing and understanding model, that the expressed sentiment associated with the software product is negative sentiment;
generate a recommendation to implement the related software product as the optimization to the software product;
send the recommendation to implement the related software product as the optimization to the software product to the group of users corresponding to the entity using an optimal notification application;
receiving, by the computer, an input to implement the related software product as the optimization to the software product; and
automatically implementing, by the computer, the related software product as the optimization to the software product in response to receiving the input to increase at least one of usage, performance, functionality, capability of the software product.

15. The computer program product of claim 14, wherein the set of opted in user-to-user business-related conversations comprise both verbal and textual conversations.

16. The computer program product of claim 14, wherein the program instructions further cause the computer to:
receive feedback from the group of users corresponding to the entity regarding implementation of the related software product as the optimization to the software product; and
utilize the feedback from the group of users corresponding to the entity regarding the implementation of the related software product as the optimization to the software product to retrain the natural language processing and understanding model to increase accuracy of software product optimization recommendations.

17. The computer program product of claim 14, wherein the program instructions further cause the computer to:
perform an analysis of a current inventory of the entity;
determine whether a current inventory level of the related software product is greater than a defined minimum inventory threshold level for the related software product based on the analysis of the current inventory of the entity; and
determine that the related software product is available for the optimization of the software product in response to determining that the current inventory level of the related software product is greater than the defined minimum inventory threshold level for the related software product based on the analysis of the current inventory of the entity.

18. The computer program product of claim 14, wherein the program instructions further cause the computer to:
determine the optimal notification application corresponding to the group of users based on at least one of type of content to be included in the recommendation, context of the set of opted in user-to-user business-related conversations among the group of users corresponding to the entity, user preferences, and location of the related software product in the software product catalog of the entity.

19. The computer program product of claim 14, wherein the program instructions further cause the computer to:
receive consent from the group of users corresponding to the entity to access and process the set of opted in user-to-user business-related conversations among the group of users occurring via the set of opted in user-to-user communication applications that includes at least one of verbal communications and textual communications among the group of users;
access the software product catalog corresponding to the entity that includes a plurality of software products corresponding to the entity; and access the set of opted in user-to-user communication applications to process the set of opted in user-to-user business-related conversations among the group of users.

20. The computer program product of claim 14, wherein the program instructions further cause the computer to:

perform, using the natural language processing and understanding model, an analysis of the set of opted in user-to-user business-related conversations among the group of users corresponding to the entity occurring via the set of opted in user-to-user communication applications;

determine, using the natural language processing and understanding model, a context of the set of opted in user-to-user business-related conversations among the group of users corresponding to the entity based on the analysis of the set of opted in user-to-user business-related conversations; and identify, using the natural language processing and understanding model, the expressed sentiment and the mentioned keywords in the set of opted in user-to-user business-related conversations among the group of users corresponding to the entity based on the context of the set of opted in user-to-user business-related conversations.

* * * * *